United States Patent
Kuttenberger

(10) Patent No.: US 12,461,197 B2
(45) Date of Patent: Nov. 4, 2025

(54) METHOD FOR IDENTIFYING MISALIGNMENTS OF A SENSOR

(71) Applicant: Robert Bosch GmbH, Stuttgart (DE)

(72) Inventor: Alfred Kuttenberger, Weil der Stadt (DE)

(73) Assignee: ROBERT BOSCH GMBH, Stuttgart (DE)

(*) Notice: Subject to any disclaimer, the term of this patent is extended or adjusted under 35 U.S.C. 154(b) by 396 days.

(21) Appl. No.: 17/893,494

(22) Filed: Aug. 23, 2022

(65) Prior Publication Data

US 2023/0073672 A1 Mar. 9, 2023

(30) Foreign Application Priority Data

Sep. 6, 2021 (DE) .................... 10 2021 209 789.8

(51) Int. Cl.
*G01S 7/40* (2006.01)
*G01S 13/931* (2020.01)
(52) U.S. Cl.
CPC ............. *G01S 7/40* (2013.01); *G01S 13/931* (2013.01)
(58) Field of Classification Search
None
See application file for complete search history.

(56) References Cited

U.S. PATENT DOCUMENTS

| | | | | |
|---|---|---|---|---|
| 2005/0062615 A1* | 3/2005 | Braeuchle | ............. | G01S 13/867 340/903 |
| 2012/0290169 A1* | 11/2012 | Zeng | ...................... | G01S 7/4972 701/30.2 |
| 2017/0254881 A1* | 9/2017 | Takaki | .................. | G01S 13/931 |
| 2017/0261600 A1* | 9/2017 | Maennicke | ........... | G01S 7/4026 |
| 2019/0120934 A1* | 4/2019 | Slutsky | ................ | G01S 13/931 |
| 2020/0282929 A1* | 9/2020 | Kroeger | ................... | G01S 7/497 |
| 2020/0309937 A1* | 10/2020 | Buddendick | .......... | G01S 7/4026 |
| 2021/0190934 A1* | 6/2021 | Kondo | ..................... | G01S 13/70 |
| 2021/0221403 A1* | 7/2021 | Gyllenhammar | .... | G05D 1/0276 |
| 2021/0349183 A1* | 11/2021 | Lee | ........................ | G01S 13/343 |

* cited by examiner

*Primary Examiner* — Marcus E Windrich
(74) *Attorney, Agent, or Firm* — NORTON ROSE FULBRIGHT US LLP

(57) ABSTRACT

A method for identifying misalignments of a sensor of a sensor system of a motor vehicle, having at least one further sensor. The method includes ascertaining an associated position of an object in an overlap zone of at least two detection zones by way of the respective sensor which forms the overlap zone, comparing the ascertained positions with one another and, in the event of a deviation of the positions, identifying a misalignment. Alternatively or additionally, the movement of an object in a detection zone of a sensor can be tracked and used for identifying a misalignment.

9 Claims, 2 Drawing Sheets

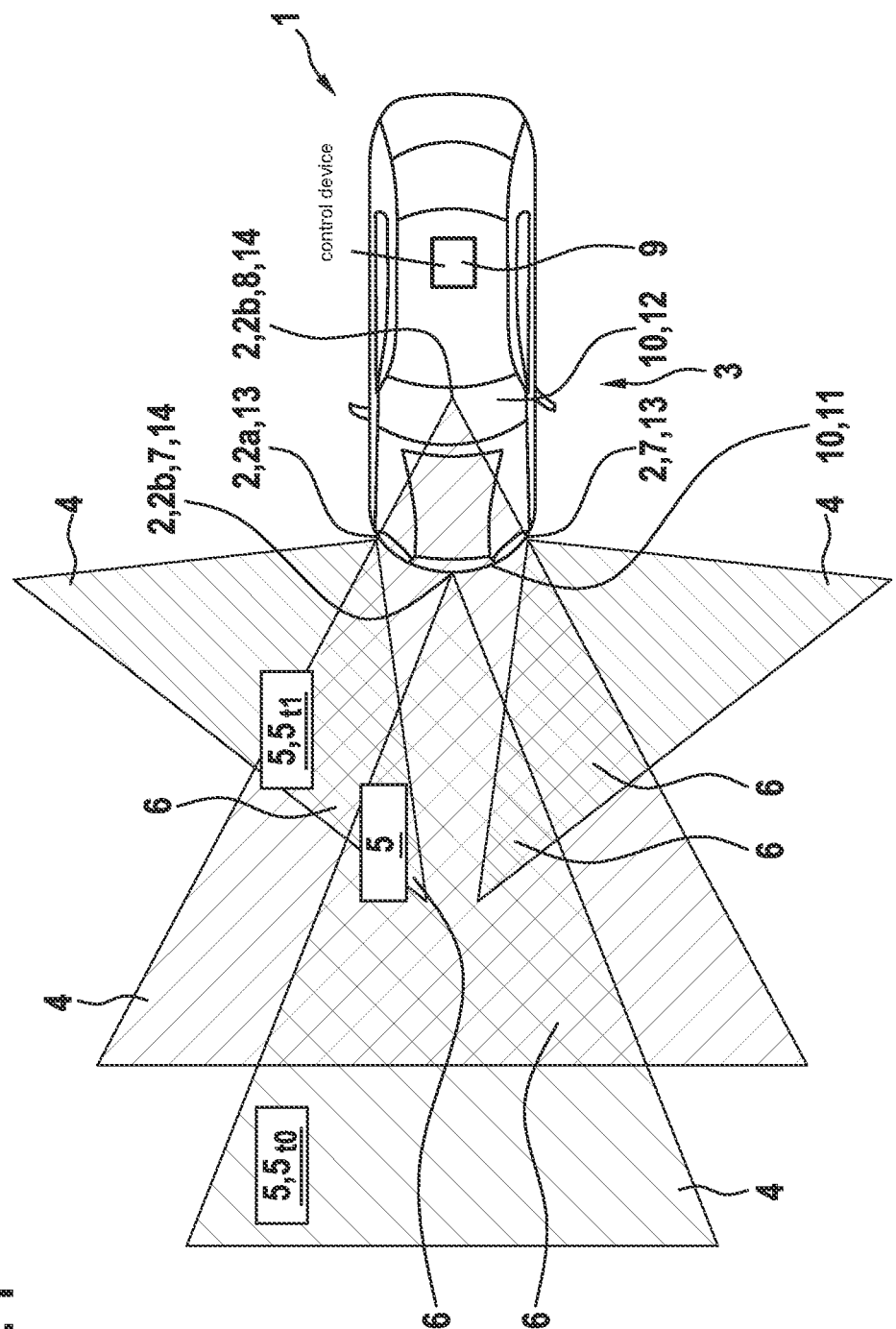

METHOD FOR IDENTIFYING MISALIGNMENTS OF A SENSOR

CROSS REFERENCE

The present application claims the benefit under 35 U.S.C. § 119 of German Patent Application No. DE 10 2021 209 789.8 filed on Sep. 6, 2021, which is expressly incorporated herein by reference in its entirety.

FIELD

The present invention relates to a method for identifying misalignments of a sensor in a sensor system having at least two sensors. The present invention further relates to a motor vehicle with such a sensor system.

BACKGROUND INFORMATION

Sensors generally serve the purpose of detecting objects in an associated detection zone. A known and specified orientation and position of the respective sensor is necessary if such objects are to be detected reliably. In particular in applications in which a position of the object relative to the sensor is to be ascertained by way of the sensor, it is important to know and to specify the orientation and position of the sensor. For this purpose, sensors are usually aligned in the associated application, for example in a motor vehicle. Alignment gives rise to the known and/or specified orientation and position of the sensor.

Unwanted movement of the sensor may occur during sensor operation. This results in a change in the orientation and/or position of the sensor from the desired and/or specified orientation and/or position. Such changes are hereinafter also denoted misalignment. Misalignments may occur in a motor vehicle for example due to a mechanical action on the sensor and/or on a component on which the sensor is mounted. Misalignments may likewise occur due to replacement of the component and/or sensor.

SUMMARY

An object of the present invention is to provide a method for identifying misalignments of a sensor, in particular in a motor vehicle, and to provide improved or at least different embodiments for a motor vehicle having such a sensor which are distinguished by simpler and/or faster identification of sensor misalignments.

The object may be achieved according to the present invention by the features disclosed herein. Advantageous embodiments of the present invention are disclosed herein.

The present invention is based on identifying a misalignment of a sensor by comparing a position of an object ascertained by way of the sensor with the position of the object ascertained by way of another sensor and, in the event of a deviation of the two determined positions, to identify a misalignment of the sensor. A further sensor detecting the same object is therefore used to check correct sensor alignment. Misalignment of the sensor can consequently be simply and effectively identified. In comparison with an identification of a misalignment in which an object is observed over an extended duration and/or a plurality of objects are observed, the present invention may achieve faster identification of misalignments.

In accordance with an example embodiment of the present invention, the sensor is a constituent part of a sensor system which comprises at least one further sensor. During operation, the respective sensor detects objects in an associated detection zone.

According to a first variant of the present invention, the detection zone of the sensor to be tested and the detection zone of at least one other sensor overlap in an overlap zone. On detection of an object in the overlap zone, the respective sensor whose detection zone forms the overlap zone ascertains an associated position of the object. The ascertained positions are then compared with one another, misalignment of the sensor being identified in the event of a deviation of the ascertained positions.

A position of the object in the overlap zone is thus simultaneously ascertained by way of the sensor to be tested and by way of the other sensor. These two positions are compared with one another, misalignment of the sensor to be tested being identified in the event of a deviation of these two positions.

According to a second variant of the present invention, on detection of an object in the detection zone of a sensor, the movement of the object toward the detection zone of another sensor is tracked. The object is thus tracked. On the basis of the movement, a position of the object in the detection zone of the other sensor at a specific point in time is determined in advance. In addition, the position of the object at the specific point in time in the detection zone of the other sensor is ascertained. If the ascertained position and the position determined in advance differ from one another, a misalignment of the sensor to be tested is identified.

The second variant of the present invention is in particular used if the detection zone of the sensor to be tested does not form an overlap zone or does not form a sufficiently large overlap zone with the detection zone of the other sensor.

Prior determination of the position of the object in the detection zone of the other sensor amounts to a prediction, in particular on the basis of kinetic findings and/or circumstances such as the speed and the direction of movement of the object.

It goes without saying that the first and the second variants of the present invention can also be used in combination.

Misalignment should in the present case be taken to mean a change in the position and/or orientation of the sensor from a specified or known position and/or orientation.

Identification of the misalignment of the sensor may be used in any desired application.

Identification of the misalignment of the sensor is preferably used in a motor vehicle. The motor vehicle thus has the sensor system and is designed to carry out the method. The motor vehicle may for this purpose have a control device communicatively connected to the sensors.

According to an example embodiment of the present invention, a computer program product can be stored, in particular in the control device, for carrying out the method(s) according to the present invention.

Misalignment of the sensor to be tested is conveniently identified when the deviation of the ascertained positions is above a limit. This in particular prevents slight deviations from leading to incorrectly identified misalignments.

Before the misalignment is identified, measures are conveniently taken to ascertain the position of the same object with the sensors. For this purpose, in particular geometric and/or optical properties of the object may be ascertained by way of sensors and compared.

The position of the object may be ascertained by way of the respective sensor in any desired manner. It is possible to carry out a triangulation for this purpose.

The sensors whose detection zones overlap in an overlap zone are hereinafter for simplicity's sake also denoted the sensors which form the overlap zone.

In preferred example embodiments of the present invention, in addition to the position of the object, an extent ascertained by way of the respective sensor is used to identify the misalignment. This proceeds such that, in the event of a deviation of the ascertained extents, the deviation is taken into account on identification of the misalignment. For example, a misalignment can be identified in the event of such a deviation, in particular above a specified limit. Likewise, in the event of a deviation between the ascertained extents, in particular above a specified limit, the deviation can be used as weighting for the misalignment of the sensor to be tested. The precision of the identified misalignment is thus increased.

It is accordingly preferred if an associated extent of the object is ascertained for the object identified in the respective detection zone, in particular in the overlap zone, by way of the respective sensor, in particular the sensor which forms the overlap zone. The ascertained extents are then compared with one another. In the event of a deviation of the ascertained extents, the deviation of the extents is taken into account on identification of the misalignment.

Alternatively or additionally, the precision of the identification of the misalignment may be increased in that an orientation of the object identified in the respective detection zone, in particular in the overlap zone, is ascertained by way of the respective sensor and, in the event of a deviation of the ascertained orientations, the deviation is taken into account on identification of the misalignment. In this case, a misalignment can be identified in the event of such a deviation, in particular above a specified limit of the deviation. Likewise, in the event of a deviation between the ascertained orientations, in particular above a specified limit, it is possible to use the deviation as weighting for the misalignment of the sensor to be tested.

It is consequently preferred if an associated orientation of the object is ascertained for the object identified in the respective detection zone, in particular in the overlap zone, by way of the respective sensor, in particular the sensor which forms the overlap zone. The ascertained orientations are here compared. In the event of a deviation of the ascertained orientations, in particular above a specified limit, the deviation of the orientations is taken into account on identification of the misalignment.

The respective sensor may be of any desired type. In particular, it is possible for at least one of the sensors to detect the object by way of electromagnetic radiation. Video sensors, radar sensors, lidar sensors and the like may in particular be used.

If a misalignment of the sensor to be tested is identified, the method may be continued in various ways.

It is possible, for example, to determine a value of the misalignment on identification of a misalignment. This value can then be taken into account as a correction on identification of objects by the sensor.

It is alternatively possible to determine the value of the misalignment and to align the sensor on the basis of the value, i.e. to correct the misalignment. This conveniently proceeds automatically. At least one actuator may, for example, be used for this purpose. The at least one actuator is advantageously connected to the control device, such that the control device can actuate the at least one actuator.

It is possible, on identification of a misalignment of the sensor, to disable a function dependent on objects identified by the sensor. Thus, in particular, incorrect and/or unwanted performance of the function is avoided or the probability of such performance is at least reduced.

When the sensor system is used in a motor vehicle, the function may be one which is automatically performed on identification of a corresponding object by way of the sensor. The function may be an at least semi-autonomous driving function. The function may for example be automatic braking, high-beam assist and the like or combinations thereof.

It goes without saying that, in addition to the method, a motor vehicle having the sensor system in which the method of the present invention is carried out also falls within the scope of the present invention.

According to an example embodiment of the present invention, it is preferred here for the sensor to be tested and the other sensor, in particular the sensor which forms the overlap zone with the sensor to be tested, to be arranged on the motor vehicle at a distance from one another and/or on different components. In particular, this prevents both sensors from being misaligned in the event of force being applied to one of the components.

In particular, it is possible for one of the sensors to be arranged on a bumper and the other sensor on the windshield of the motor vehicle. If the sensor mounted on the bumper is misaligned due to application of force to the bumper, for example in the event of a parking bump, the sensor mounted on the windshield is not misaligned at the same time and vice versa. Likewise, replacement of one of the components cannot result in misalignment of both sensors.

The sensor to be tested and the other sensor may be of the same type. For example, both sensors may be radar sensors, video sensors, and the like.

It is also possible for the sensor to be tested and the other sensor to be of different types. For example, one of the sensors may be a radar sensor and the other sensor a video sensor.

Further important features and advantages of the present invention are disclosed herein, including, e.g., the figure and the associated description of the figure made with reference to the figure.

It goes without saying that the above-mentioned features and those still to be explained below may be used not only in the respectively stated combination but also in other combinations or alone, without going beyond the scope of the present invention.

A preferred exemplary embodiment of the present invention is illustrated in the figure and will be explained in greater detail in the following description, identical reference signs relating to identical or similar or functionally identical components.

BRIEF DESCRIPTION OF THE DRAWING

FIG. 1 shows a plan view of a motor vehicle with a sensor system, according to an example embodiment of the present invention.

DETAILED DESCRIPTION OF EXAMPLE EMBODIMENTS

Figure 3:
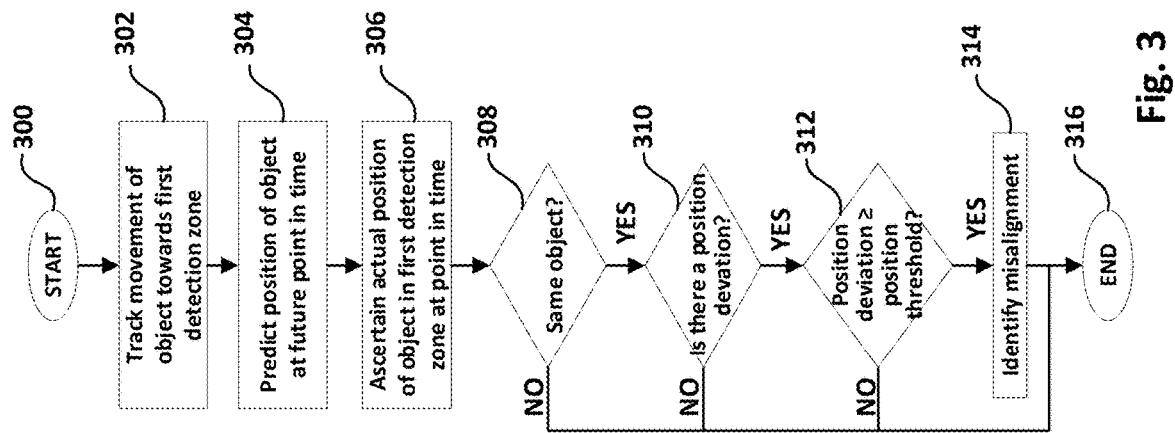
FIG. 3 is a flowchart of steps of a method for diagnosing a sensor misalignment based on a deviation between a position estimated for a future point in time and an actual position detection occurring at that later point in time, according to an example embodiment of the present invention.

In an exemplary embodiment, a sensor system 3, as is for example shown in FIG. 1, is used in a motor vehicle 1. The sensor system 3 comprises at least two sensors 2. In the exemplary embodiment shown, the sensor system 3 comprises purely by way of example four sensors 2. The respective sensor 2 detects objects 5 in an associated detection zone 4 indicated in FIG. 1. In the exemplary embodiment shown, the detection zones 4 of at least two of the sensors 2 overlap in an overlap zone 6. The respective detection zone 4 is in the surroundings of the motor vehicle 1. The sensors 2 thus detect objects 5 in the surroundings of the motor vehicle 1.

In the exemplary embodiment shown, the sensor system 3 has, purely by way of example, two sensors 2 which are mounted laterally on the motor vehicle 1 and oriented laterally in the direction of travel, which are hereinafter also denoted side sensors 13. The respective side sensor 13 ascertains a lateral zone as a detection zone 4 for objects 5. The respective side sensor 13 may be a radar sensor 7. The sensor system 3 additionally comprises two sensors 2 which are oriented forward in the direction of travel, which are hereinafter also denoted front sensors 14. One of the front sensors 2 is a radar sensor 7 and the other front sensor 2 a video sensor 8.

As is furthermore shown in FIG. 1, in the exemplary embodiment shown, the detection zone 4 of the respective side sensor 13 forms an associated overlap zone 6 with the detection zone 4 of the respective front sensor 14. In other words, the detection zone 4 of the respective side sensor 13 forms an associated overlap zone 6 with the detection zone 4 of the front sensor 14 configured as a radar sensor 7. In addition, the detection zone 4 of the respective side sensor 13 forms an associated overlap zone 6 with the detection zone 4 of the front sensor 14 configured as a video sensor 8. The detection zones 4 of the two front sensors 14 additionally form an associated overlap zone 6.

As is furthermore shown in FIG. 1, the detection zone 4 of the respective side sensor 13 also forms an overlap zone 6 with the detection zone 4 of the respective front sensor 14. These overlap zones 6 are thus formed by three sensors 2, namely in each case by one of the side sensors 13 and the two front sensors 14.

In the exemplary embodiment shown, the radar sensors 13 and the video sensor 8 are arranged, in particular mounted, on different components 10 of the motor vehicle 1. The radar sensors 7 are arranged on a bumper 11 and the video sensor 8 on a windshield 12 of the motor vehicle 1.

In order to identify a misalignment of a sensor 2a to be checked, account is taken of the overlap zone 6 of the sensor 2a to be tested with a further sensor 2b. In this case, an associated position of the object 5 is ascertained by way of the respective sensor 2a, 2b which forms the overlap zone 6. In other words, an associated position of the object 5 is ascertained, for example by triangulation, using data from the sensor 2a to be checked and using data from the further sensor 2b in the overlap zone 6. At least two ascertained positions for the object 5 are thus available. These ascertained positions are compared with one another. In the event of a deviation of the position ascertained by way of the sensor 2a to be tested from the at least one other ascertained position, in particular above a specified limit, a misalignment of the sensor 2a to be tested is identified. In the exemplary embodiment shown, it is assumed purely by way of example that, in the depiction of FIG. 1, it is the right-hand side sensor 13 which is the sensor 2a to be tested. Furthermore, in the exemplary embodiment shown, it is assumed purely by way of example that the front sensor 14 configured as a radar sensor 7 and/or the front sensor 14 configured as a video sensor 8 is/are the further sensor 2b.

As is likewise shown in FIG. 1, a misalignment can also be identified by an object 5 being identified in a detection zone 4 and the movement of the object 5 toward the detection zone 4 of a further sensor 2 being tracked. On the basis of the movement, a position of the object 5 in the detection zone 4 of the further sensor 2 at a specific point in time is determined in advance. At the specific point in time, the position of the object 5 in the detection zone 4 of the further sensor 2 is ascertained. In the event of a deviation of the ascertained position from the position determined in advance, a misalignment of one of the sensors 2 is identified. One of the sensors 2 may here be the sensor 2a to be checked. In other words, the sensor 2a to be checked may be that sensor 2 in whose detection zone 4 the object is identified and the movement of the object 5 toward the detection zone 4 of a further sensor 2b is tracked. The sensor 2a to be checked may likewise be that sensor 2 in whose detection zone 4 the position of the object 5 at the specific point in time is determined in advance by way of the further sensor 2b on the basis of the movement of the object 5. In the exemplary embodiment shown, an object 5 is identified at a point in time in the detection zone of the front sensor 14 configured as a radar sensor 7. In FIG. 1, the object 5 in the detection zone 4 of the front sensor 14 configured as a radar sensor 7 is therefore also denoted 5_t0. The movement of the object 5 toward the detection zone 4 of the side sensor 13, which is configured as a radar sensor 7 and shown on the right in the depiction of FIG. 1, is tracked. On the basis thereof, a position of the object 5 in the detection zone 4 of the left side sensor 13 configured as radar sensor 7 at a later specific point in time is determined in advance. According to this prior determination, the object 5 is thus located at the specific point in time in the detection zone 4 of the side sensor 13, which is configured as a radar sensor 7 and shown on the left in the depiction of FIG. 1. In FIG. 1, the object 5 in the detection zone 4 of the left side sensor 13 configured as a radar sensor 7 is therefore also denoted 5_t1. At the specific point in time, the position of the object 5 is furthermore ascertained by way of the left side sensor 13 configured as a radar sensor 7. If the ascertained position and the position determined in advance differ from one another, a misalignment is identified. In the exemplary embodiment shown, it is here assumed purely by way of example that the left side sensor 13 configured as a radar sensor 7 is the sensor 2a to be tested and the front sensor 14 configured as a video sensor 8 is the further sensor 2b.

Before the positions are compared with one another, it is conveniently ascertained whether the two sensors 2a, 2b are detecting the same object 5. For this purpose, in particular geometric and/or optical features of the object 5 may be ascertained by way of the respective sensor 2a, 2b and compared with one another.

On identification of the misalignment, an extent of the object 5 may be ascertained by way of the respective sensor 2a, 2b and compared with one another. In particular, this means that an associated extent of the object 5 is ascertained for the object 5 by way of the respective sensor 2a, 2b. At least two ascertained extents of the object 5 are thus available. These extents are compared with one another. In the event of a deviation of the extent ascertained by way of the sensor 2a to be tested from the at least one other ascertained extent, in particular above a specified limit, account is taken of the deviation of the extents on identification of the misalignment. In the simplest case this can be achieved by the deviation of the ascertained extents meaning a misalignment. In other words, a misalignment is identified in the event of a deviation of the ascertained extents. Alternatively or additionally, the deviation of the ascertained extents can be taken into account as a weighting on identification of the misalignment.

It is likewise possible, on identification of the misalignment by way of the respective sensor 2a, 2b, to take account of an orientation of the object 5, for example a longitudinal extent of the object 5. In particular, this means that an associated orientation of the object 5 is ascertained for the identified object 5 by way of the respective sensor 2a, 2b. At least two ascertained orientations are thus available which are compared with one another. In the event of a deviation of the orientation ascertained by way of the sensor 2a to be tested from the at least one other ascertained orientation, account is taken of the deviation of the orientations on identification of the misalignment. In the simplest case, a misalignment is identified in the event of a deviation of the ascertained orientations, in particular above a specified limit. The deviation of the ascertained orientations can likewise be taken into account as a weighting on identification of a misalignment.

If a misalignment of the sensor 2a to be tested is identified, this can be taken into account in various ways. For example, a value of the misalignment can be determined and, on identification of objects 5 by the sensor 2a to be tested, taken into account as a correction. It is alternatively possible to eliminate the misalignment automatically. For this purpose, on identification of a misalignment, a value of the misalignment can be determined and the misalignment automatically eliminated by an alignment. For this purpose, the sensor system 3 and/or the motor vehicle 1 may have appropriate actuators which are not shown. It is also possible, on identification of a misalignment of the sensor 2a, to disable a function in the motor vehicle 2 which is dependent on objects 5 detected by the sensor 2a to be tested. In particular, these are functions of at least partially autonomous driving and/or automatic actuation of components of the motor vehicle 1, for example automatic braking, high-beam assist and the like.

The described method is carried out automatically. A control device 9 is used for this purpose. The control device 9 is shown in greatly simplified form in FIG. 1. The control device 9 is communicatively connected to the sensors 2 and configured to carry out the method. The control device 9 may for this purpose contain an algorithm, in particular a computer program product.

The misalignment is preferably identified by way of two sensors 2a, 2b which are arranged on different components 10 of the motor vehicle 1 and/or at a distance from one another. This in particular thus prevents a mechanical application of force, in particular damage to the component 10 and/or replacement of component 10, from resulting in misalignment of both sensors 2a, 2b or at least avoids this risk.

Accordingly, a misalignment is preferably identified by an object 5 in the overlap zone 6 formed by the detection zone 4 of the front sensor 14 configured as a video sensor 8 and the detection zone 4 of the side sensor 13, which is configured as a radar sensor 7 and shown on the left in the depiction of FIG. 1. It can thus be identified whether it is the front sensor 14 configured as a video sensor 8 or the side sensor 13 shown on the left in the depiction of FIG. 1, which is misaligned. Sensors 2 of different types are thus furthermore used for identifying the misalignment.

A misalignment is likewise preferably identified by an object 5 in the detection zone 4 of the front sensor 14 configured as a video sensor 8 and in the detection zone 4 of one of the side sensors 13 and the detection zone 4 of the front sensor 14 configured as a radar sensor 7. It can thus be highly reliably identified whether one of the front sensors 14 or the side sensor 13 is misaligned.

Figure 2:
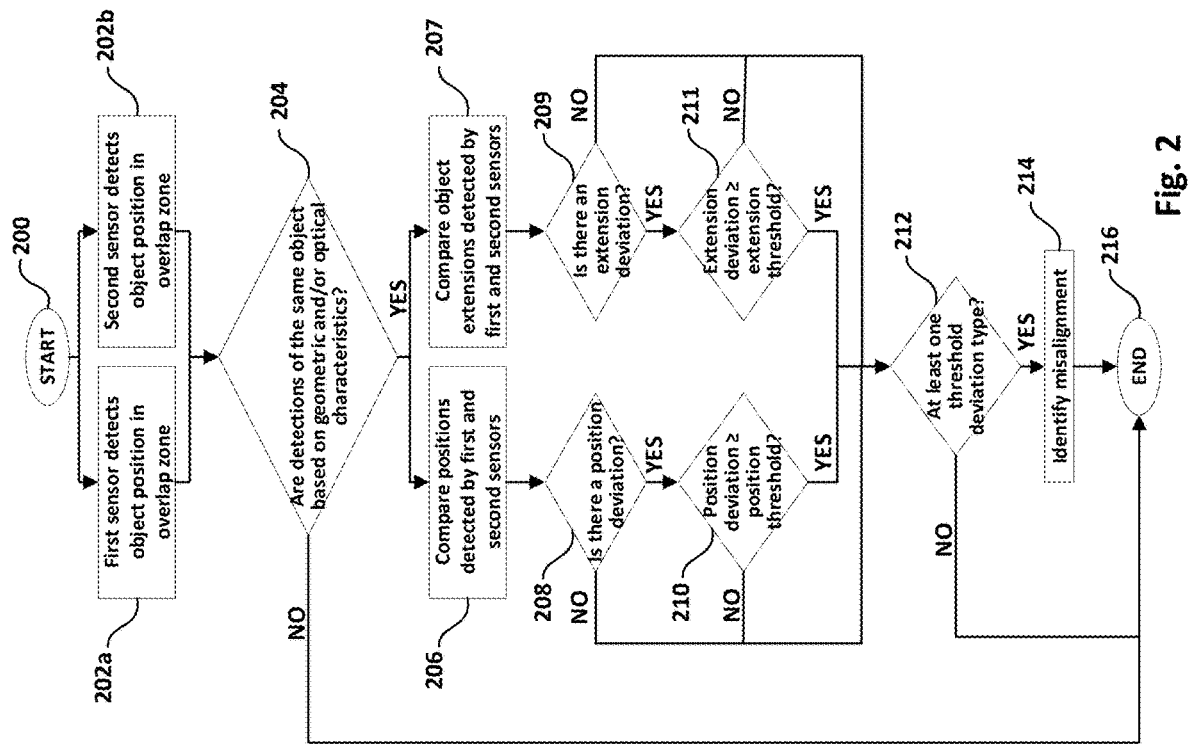
FIG. 2 is a flowchart of steps of a method for diagnosing a sensor misalignment based on a deviation between simultaneous detections of an overlap zone of two different sensors, according to an example embodiment of the present invention.

FIG. 2 shows a flowchart of a method for detecting sensor misalignment according to an example embodiment of the present invention. The method starts at 200. At 202a, a first one of the sensors detects the position of an object in an overlap zone and, at 202b, a second one of the sensors detects the position of the object in the overlap zone. At 204, it is determined whether the object whose position are detected by the first and second sensor are in fact the same object based on geometric and/or optical characteristics. If it is the same object, then, at 206, the respective positions are compared, and, at 207, respective detections of extensions of the object are compared. At 208, it is determined whether there is a deviation between the positions as detected by the first and second sensors. At 210, it is determined whether the position deviation meets at least a predefined position threshold. At 209, it is determined whether there is a deviation between the extensions as detected by the first and second sensors. At 211, it is determined whether the extension deviation meets at least a predefined position threshold. If, at 212, there is at least one threshold deviation (position and/or extension), then, at 214, a misalignment is determined based on the threshold deviation(s), and the method ends at 216.

FIG. 3 shows a flowchart of a method for detecting sensor misalignment according to another example embodiment of the present invention. The method starts at 300. At 302, movement of an object is tracked while it is outside a first detection zone as moving, within a second detection zone, towards the first detection zone. Based on the tracking, at 304 and still while the object is in the second detection zone and outside the first detection zone, a predicted position that the object will assume in the first detection zone at a specific future point in time is estimated. At 306, when the point in time is actually reached, a sensor performs a detection ascertaining an actual position of the object in the first detection zone. At 308, it is checked that the detection by the sensor is the same object that had been tracked. At 310, it is determined whether there is a deviation between the predicted position and the sensed actual position. At 312, it is determined whether the deviation is at least a threshold deviation. At 314, a misalignment of the sensor is determined based on the threshold deviation.

What is claimed is:

1. A method for identifying misalignments of a first sensor of a sensor system of a motor vehicle, the first sensor being configured to perform geospatial positioning detections within an entirety of a first detection zone, the first detection zone overlapping with a second detection zone that is different than the first detection zone, a second sensor being configured to perform geospatial positioning detections within an entirety of the second detection zone, the overlapping of the first and second detection zones being in an entirety of an overlap zone that is part of each of the first and second detection zones, the method comprising the following steps:

simultaneously (I) detecting, by the geospatial positioning detections of the first sensor, a first object position, with respect to at least one spatial dimension, in the overlap zone, and (II) detecting, by the geospatial positioning detections of the second sensor, a second object position, with respect to the at least one spatial dimension, in the overlap zone;

determining that the detections by the first and second sensors are of a same object based on at least one of detected intrinsic geometric characteristics of the object independent of the geospatial positioning and detected optical characteristics of the object;

determining, based sensor output of the first and second sensors, at least one respective measurement of a spatial extension of the object, which is a measurement of how much the object extends with respect to at least one spatial dimension; and based on the determination that the detections are of the same object:
  comparing the first and second object positions with each other to ascertain a position deviation between the first and second object positions;
  comparing the respective measurements of the spatial extension to ascertain an extension deviation between the respective spatial extension measurements;
  determining that each of the deviations is greater than a respective predefined threshold deviation; and
  in response to the determination that each of the deviations is greater than the respective predefined threshold deviation, identifying a misalignment of the first sensor based on a combination of the position deviation and the extension deviation.

2. A method for identifying misalignments of a first sensor of a sensor system of a motor vehicle, the first sensor being configured to perform geospatial positioning detections within an entirety of a first detection zone, the method comprising:
  tracking, by one or more second sensors, movement of an object toward the first detection zone while the object is outside of the first detection zone and is in a second detection zone that is not detectable by the first sensor and an entirety of which is detectable by the one or more second sensors; based on the tracking, predicting a predicted position, in the first detection zone and with respect to at least one spatial dimension, in which the object will be at a specific point in time in the future;
  ascertaining, by the first sensor and at the specific point in time, an actual position of the object in the first detection zone and with respect to the at least one spatial dimension;
  identifying that the object whose actual position is ascertained by the first sensor is the object whose movement has been tracked based on at least one of detected intrinsic geometric characteristics of the object independent of the geospatial positioning and detected optical characteristics of the object;
  based on the identification and based on the specific point in time for which the prediction has been made, comparing the ascertained actual position of the object to the predicted position, thereby ascertaining, as a result of the comparison, a deviation between the ascertained actual position and the predicted position; and
  identifying presence of a misalignment of the first sensor in response to the ascertained deviation is greater than a predefined threshold deviation.

3. The method as recited in claim 1, wherein:
  an associated orientation of the object is ascertained for the identified object, using each of the first sensor and the second sensor;
  the ascertained orientations are compared with one another, and
  in the event of a threshold deviation of the ascertained orientations, the threshold deviation of the orientations is taken into account on identification of the misalignment.

4. The method as recited claim 1, wherein the first sensor and the second sensor are at a distance from one another.

5. The method as recited in claim 1, wherein, on identification of the misalignment:
  a degree to which the first sensor is misaligned is determined; and
  the method further comprises correcting sensor output of the first sensor based on the determined degree to which the first sensor is misaligned.

6. The method as recited in claim 1, wherein, on identification of the misalignment:
  degree to which the first sensor is misaligned is determined; and
  the method further comprises automatically shifting the first sensor in a manner that removes the misalignment, the shifting being performed according to the determined degree.

7. The method as recited in claim 1, wherein, on identification of the misalignment of the first sensor, a function dependent on identifications by the first sensor is disabled.

8. A motor vehicle, comprising:
  a sensor system having a first sensor configured to perform geospatial positioning detections within an entirety of a first detection zone in surroundings of the motor vehicle and a second sensor configured to perform geospatial positioning detections within an entirety of a second detection zone that is different than the first detection zone, the first and second detection zones overlapping in an entirety of an overlap zone that is part of each of the first and second detection zones; and
  a control device configured to, during operation of the motor vehicle in which, simultaneously, (I) the first sensor detects, by the geospatial positioning detections of the first sensor, a first object position, with respect to at least one spatial dimension, in the overlap zone, and (II) the second sensor detects, by the geospatial positioning detections of the second sensor, a second object position, with respect to the at least one spatial dimension, in the overlap zone:
    determine that the detections by the first and second sensors are of a same object based on at least one of detected intrinsic geometric characteristics of the object independent of the geospatial positioning and detected optical characteristics of the object;
    determine, based sensor output of the first and second sensors, at least one respective measurement of a spatial extension of the object, which is a measurement of how much the object extends with respect to at least one spatial dimension; and
    based on the determination that the detections are of the same object:
      compare the first and second object positions with each other to ascertain a position deviation between the first and second object positions;
      compare the respective measurements of the spatial extension to ascertain an extension deviation between the respective spatial extension measurements;
      determine that each of the deviations is greater than a respective predefined threshold deviation; and in response to the determination that each of the deviations is greater than the respective predefined threshold deviation, identify a misalignment of the first sensor based on a combination of the position deviation and the extension deviation.

9. The motor vehicle as recited in claim 1, wherein the first and second sensors are arranged on different components of the motor vehicle and/or at a distance from one another.

\* \* \* \* \*